United States Patent [19]

MacDonald

[11] 4,039,844

[45] Aug. 2, 1977

[54] FLAME MONITORING SYSTEM

[75] Inventor: Malcolm F. MacDonald, Chelmsford, Mass.

[73] Assignee: Electronics Corporation of America, Cambridge, Mass.

[21] Appl. No.: 560,569

[22] Filed: Mar. 20, 1975

[51] Int. Cl.² .................................................. G01N 21/58
[52] U.S. Cl. ............................. 250/554; 250/214 AG; 250/214 RC; 340/228.2
[58] Field of Search ........ 250/206, 554, 214, 214 AG, 250/214 RC; 340/228.1, 228.2; 23/254 EF

[56] References Cited

U.S. PATENT DOCUMENTS

| 2,306,073 | 12/1942 | Metcalf | 240/554 |
|---|---|---|---|
| 2,911,540 | 11/1959 | Powers | 340/228.2 |
| 2,994,859 | 8/1961 | Klein | 340/228.2 |
| 3,233,650 | 2/1966 | Cleall | 340/228.2 |
| 3,321,634 | 5/1967 | Innes | 340/228.2 |
| 3,548,395 | 12/1970 | Gilbert | 340/228.2 |
| 3,613,062 | 10/1971 | Bloice | 250/206 |
| 3,689,773 | 9/1972 | Wheeler | 250/554 |
| 3,716,717 | 2/1973 | Scheidweiler et al. | 250/554 |
| 3,740,574 | 6/1973 | Taylor | 340/228.2 |
| 3,820,097 | 6/1974 | Larson | 340/228.2 |

Primary Examiner—David C. Nelms

[57] ABSTRACT

A flame monitoring system includes a flame sensor for producing a flame signal as a function of flame conditions in a monitored environment and flame signal enhancing circuitry coupled to the flame sensor. The flame signal enhancing circuitry has a first response as a function of a first characteristic of the flame signal and a second response different from the first response as a function of a second characteristic of the flame signal and is arranged to combine the first and second responses to provide an enhanced flame signal representative of the monitored flame.

24 Claims, 4 Drawing Figures

FLAME MONITORING SYSTEM

SUMMARY OF INVENTION

This invention relates to flame monitoring systems and more particularly to systems adapted for monitoring flames in multi-burner furnaces, such as boilers for large electrical power generating stations.

There is demand in modern steam generating stations, process systems and similar apparatus for the individual monitoring of burner flames so that immediate warning of flame failure can be given. The desirability of automatically monitoring flames in a furnace has long been recognized. When fuel continues to be supplied to a burner after the flame has been extinguished, the fuel may reignite explosively. While many flame detection systems responsive to flame radiation have been devised, such systems may give false indications that flame is present when they receive radiation from another source of comparable brightness, such as the furnace wall or an adjacent flame. In an effort to overcome such limitations, detector systems have been proposed which position plural detectors to view different areas of the same burner flame or which cross-correlate the signals from plural detectors positioned to view the same area of the burner flame. Certain flame detection systems utilize a flame responsive electrical output signal that has an alternating component, in some cases the utilized alternating component being in the order of 1-10 Hertz, while in other cases the utilized alternating component being of somewhat higher frequency, for example in the order of 100 Hertz.

The burner is frequently required to be monitored accurately at both low firing rates where the flame sensor must provide a useful signal when sensing radiation of low intensity, and at maximum firing rates where high radiation intensity on the flame sensor tends to mask components of higher frequency.

The source of alternating components of sensed flame radiation is not entirely clear but has been at times attributed to turbulence in the flame and/or to fluctuations in fuel supply. At the root or base of the flame, turbulence appears to distort the flame front, which distortions, it has been suggested, give rise to large variations in speed and direction of propagation of the combustion process and this may be the source of higher frequency alternating components. Lower frequency components exist in the flame region more remote from the base of the flame. With large turbulence, some unburned fuel may be carried periodically into the hotter regions of the flame where it suddenly ignites, propagating a region of hotter gas along the length of the flame. In practice, the magnitude of the higher frequency alternating component is low relative to the magnitude of the lower frequency or steady state component.

In accordance with an aspect of the invention, there is provided flame monitoring equipment for indicating the state of a burner flame by coordinating response of a single flame sensor or scanner to radiation components of different (e.g. higher and lower) frequencies that are sensed along a line of sight which passes through the root portion of the flame being monitored. The term "lower frequency components" is used herein to denominate steady and slowly varying components (up to a maximum of about 100 Hertz) while the term "higher frequency components" is used herein to denominate components that have a frequency above about 100 Hertz and up to 1000 Hertz and above.

Flame signal enhancing circuitry coupled to the flame sensor has a first response as a function of a first characteristic of the flame signal and a second response different from the first response as a function of a second characteristic of the flame signal and is arranged to combine the first and second responses to provide an enhanced flame signal representative of the monitored flame as an output signal. In preferred embodiments selective attenuation circuitry is coupled to the flame signal enhancing circuitry and has a low frequency cutoff that excludes all signals in the range of the second characteristic, a typical low frequency cutoff being about 200 Hertz. Gain adjustment means is provided for varying the magnitude of the enhanced flame signal.

The flame scanner conveniently comprises a photosensor mounted in tubular structure which serves to collimate the scanner path. The photosensor in practice may be mounted in a long tube which extends into the refractory wall of the combustion chamber; such a tube may be, for example, several feet in length to give protection for the sensor. The scanner path intersects the axis of its burner system at a selected point forward of the throat tile, a normal flame at selected point having a higher frequency component of significant intensity and the appropriate location of such point typically depending to some extent on conditions such as the nature of the fuel being fired. The root portion of a normal flame has a substantial higher frequency component while in portions of such flames more remote from the burner nozzle the magnitude of higher frequency components relative to lower frequency components is reduced. Background radiation conditions also have lower frequency characteristics. In a multi-burner system the scanner path may extend into more remote areas of the other flames (that is, areas of flames further spaced from the refractory wall than the monitored area of its flame). The ratio of lower to higher frequency components in such more remote areas is significantly greater than the lower/higher frequency component ratio in the monitored root portion of the supervised flame. Where the invention is utilized in such systems, it is not necessary that care be taken to direct the scanner away from the adjacent burners and towards a dark surface.

In preferred embodiments the signal processing circuitry produces an output that bears a direct relation to the higher frequency component and an inverse relation to the lower frequency component. While such direct and inverse relations may be obtained in various manner as, for example the higher frequency components being additively related and the lower frequency components subtractively related to the output signal, in particular embodiments the output signal is a ratio of the sensed higher and lower frequency components.

In a particular embodiment the photosensor is a silicon photodiode that has a high frequency response characteristic and a signal processing network coupled to the photodiode includes a radiation source that also has a high frequency response characteristic. A feedback circuit that includes a radiation responsive impedance element is optically coupled to the radiation source. The impedance of that impedance element changes as a function of radiation incident thereon at a rate that is much slower than the speed of response of the photodiode and of the radiation source. The feedback circuit moderates the output signal in proportion to the reciprocal of a fractional power of the low frequency component of the sensed radiation. It will be apparent that discrimination between the higher and lower frequency components of the sensed flame may be obtained in other manners, for example through use of a radiation source that has a damped output response or by separately extracting higher and lower frequency component signals and applying the extracted signals to a multiplier circuit. The alternating output signal of the signal processing network is applied to a band pass amplifier that has a pass band of about 400 Hertz and a low frequency cutoff at about 200 Hertz. The invention provides a simplified and more versatile monitoring system that is capable of providing enhanced discrimination between flames and also between flame and non-flame radiation sources in a combustion chamber. The system is useful in monitoring the quality as well as the presence of the supervised flame.

Other objects, features and advantages of the invention will be seen as the following description of a particular embodiment progresses, in conjunction with the drawings, in which.

DESCRIPTION OF PARTICULAR EMBODIMENT

Figure 1:
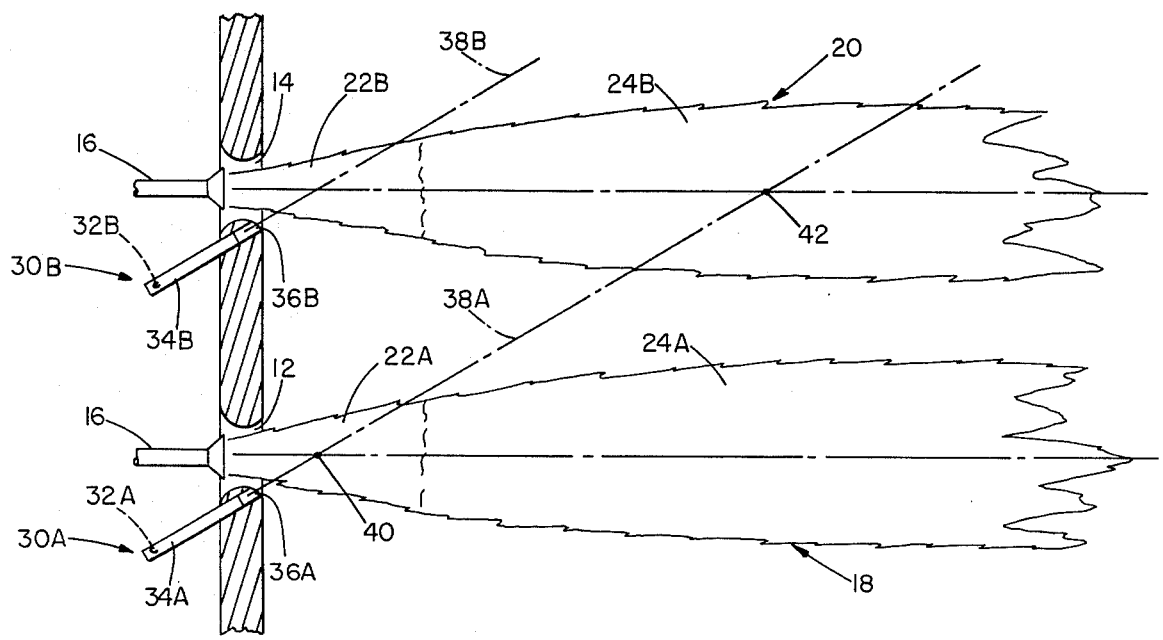
FIG. 1 is a diagrammatic view of a flame monitoring arrangement for a multi-burner furnace.

There is shown in FIG. 1 a furnace structure having a refractory wall 10 with a plurality of burner throat apertures, two of which (12, 14) are shown. Conventional fuel supply and igniter structure 16 is associated with each burner system for establishing flames 18, 20. Each flame has a primary combustion zone 22 adjacent to its burner throat aperture which contains a large proportion of unburned fuel. The brightness of this region is relatively low and high velocity air introduced through the burner throat creates turbulence in this primary combustion zone. As the flame extends further into the combustion chamber, combustion becomes complete with increased brightness in this secondary combustion zone 24, and the high frequency modulation decreases in this region. Thus the primary zone 22 has a lower brightness and a significant proportion of higher frequency components, while the secondary zone 24 is brighter and has a lesser proportion of the higher frequency components.

Figure 2:
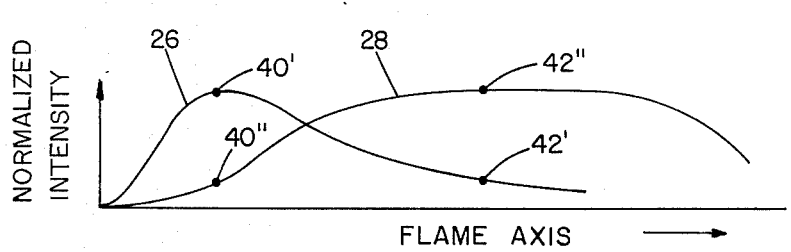
FIG. 2 is a graph indicating the normalized relation of higher frequency and lower frequency components in a flame along the length of the flame.

The graph in FIG. 2 is an indication of the proportion of the higher and lower frequency components along the flame axis, the curves 26 and 28 being normalized as a typical average magnitude of the higher frequency component (represented by curve 26) is in the order of 3-5 percent of the magnitude of the lower frequency component (represented by curve 28).

A scanner system 30 is associated with each burner and includes a sensor 32 mounted in an elongated tube 34 that extends to a port 36 in the refractory wall 10 and that defines a line of sight 38. Sensor 30A is arranged to sense flame 18, while sensor 30B is arranged to sense flame 20. Line of sight 38A passes through the primary combustion zone 22A of flame 18 (e.g. at point 40) and the secondary combustion zone 24B of flame 20 (e.g. at point 42). The relative intensities of the higher and lower frequency components at points 40 and 42 along line of sight 38A are indicated at 40' and 40'', and 42' and 42'' respectively in FIG. 2.

Figure 3:
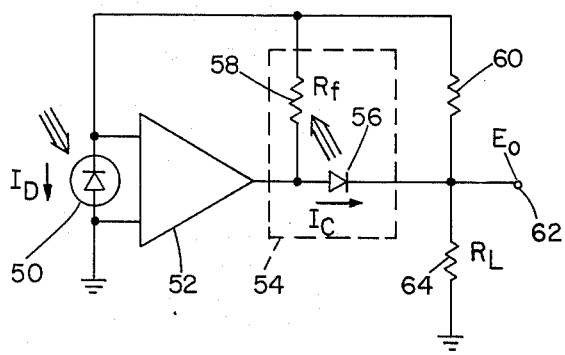
FIG. 3 is a schematic diagram of a flame sensor circuit in accordance with features of the invention.

In particular embodiments a silicon photosensor is employed, its output response to sensed radiation components varying over the range of 1 to 500 microamperes. A circuit that accommodates the large dynamic range of sensed flame conditions and also produces an output that is directly related to the sensed higher frequency components and inversely related to the sensed lower frequency (including DC) components is shown in FIG. 3. That circuit employs a silicon photodiode 50 which senses radiation energy of the flame in the rear infrared and visible red portions of the spectrum and has a speed of response that follows the second higher frequency components of the flame. The output of diode 50 is applied to operational amplifier 52 that is connected for current to voltage conversion and that has an optical coupler unit 54 connected to its output. That optical coupler includes a light emitting diode 56 optically coupled to a photoresistor 58 (e.g. cadmium sulfide) of slower response such that its response corresponds to the average current signal through diode 56. Resistor 60 connected in parallel with photoresistor 58 in the feedback path of operational amplifier 52 limit the maximum gain of the circuit.

The transfer function for this circuit is of the form:

$$E_{0(AC)} = \frac{K I_{D(AC)}}{I_{D(DC)}^n}$$

where $n$ has been found to be in the range of 0.6-0.8.

Thus, the AC output signal ($E_0(AC)$) is directly proportional to the AC component of the current ($I_D$) flowing through photodiode 50 and inversely proportional to a fractional power of the DC component of the current flowing through diode 50. As $I_C$ (the output current) increases, the illumination of $R_f$ increases and causes its resistance value to decrease. The effect is to decrease the gain of the circuit. The frequency response of photosensor 58 in the optical coupler is less than 100 Hertz, lower than the response of photosensor 50 and so slow that it does not affect the high frequency component of the signal of interest.

This detection system senses the presence of flame of the particular burner it is supervising by sensing the presence of the higher frequency component of the signal, which signal presence is moderated by the effect of the second lower frequency component. Thus if there is either a significant decrease of the higher frequency signal or the lower frequency signal increases significantly more than the higher frequency signal, the output voltage will be reduced providing a flame out indication. The relationship between the higher and lower frequency components of a sensed flame is also useful in monitoring the quality of that flame.

The relationship between higher and lower frequency components of the radiation conditions along the sensed path in the combustion chamber may be usefully provided in various forms, for example a ratio of the higher to the lower frequency components or a diference between normalized values of the higher and lower frequency components, and by circuit arrangements other than that shown in FIG. 3.

Figure 4:
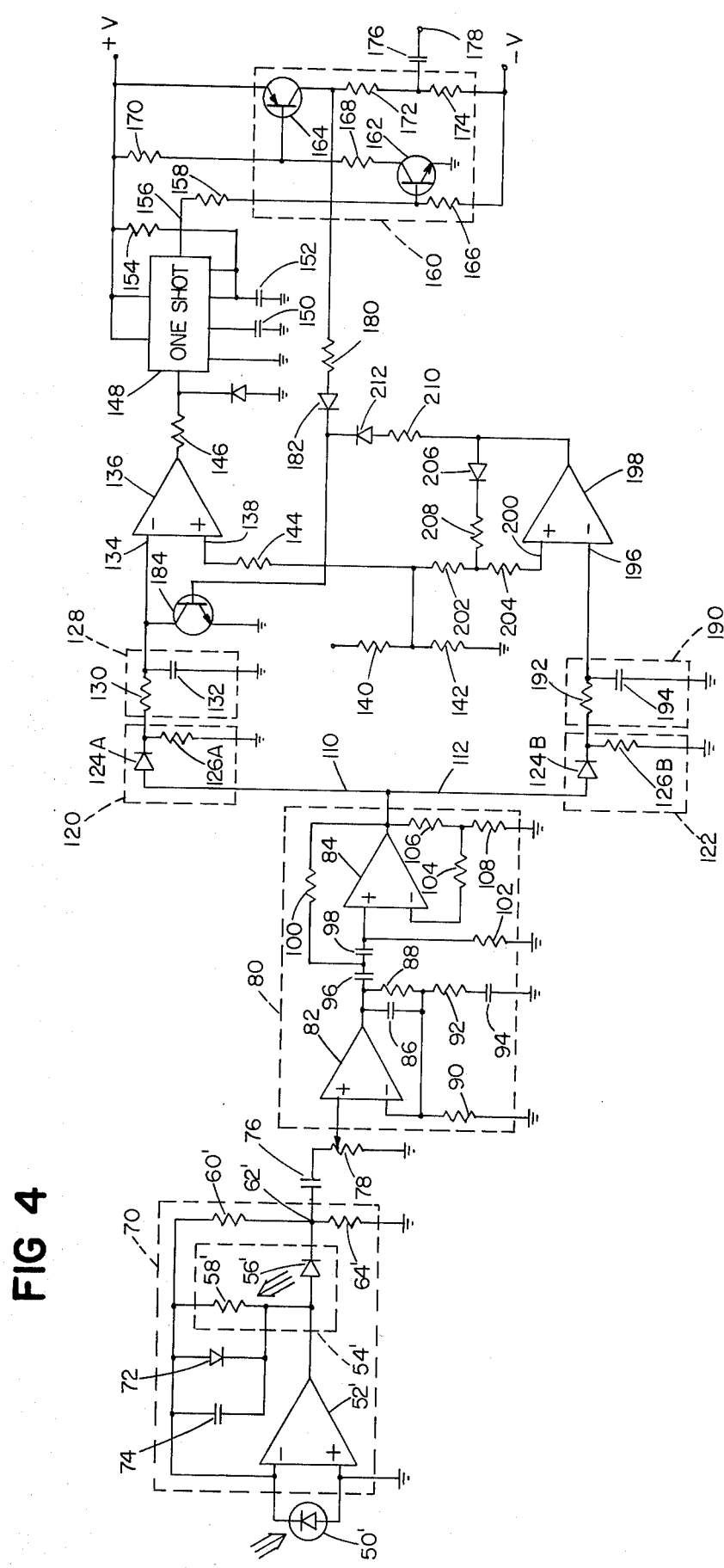
FIG. 4 is a circuit diagram illustrating a flame monitoring system in accordance with the invention.

A schematic diagram of a particular embodiment is shown in FIG. 4. That circuit includes a flame sensor 50' connected across the input terminals of operational amplifier 52'. Sensor 50' is a silicon diode that is connected to operate in a photoconductive mode as a current source so that the sensed radiation intensity modifies the diode current flow as a function of the radiation incident on the diode. Connected to the output of amplifier 52' is a photocoupler 54' that includes a silicon light emitting diode 56' optically coupled to a cadmium sulfide photoresistor 58'. Supplemental resistor 60' is connected in the feedback path and diode 72 and capacitor 74 are connected across photoresistor 58'. This input stage 70 produces an output signal that is a direct function of the higher and an inverse function of the lower frequency components of the sensed radiation condition.

That output signal is coupled by capacitor 76 to a gain control potentiometer 78. Potentiometer 78 provides gain adjustment for band pass filter 80 that includes operational amplifiers 82 and 84. The band pass filter components are selected to provide a center frequency of about 400 Hertz and a pass band of 400 Hertz. The resulting output signal is applied on lines 110 and 112 to detector networks 120, 122, each of which includes a diode 124 and a resistor 126.

The signal from detector 120 is applied to high speed filter 128 that includes resistor 130 and capacitor 132 and has a time constant of about 50 milliseconds. The output of the filter 128 is applied to terminal 134 of operational amplifier 136 which is connected to function as a comparator. The voltage at reference terminal 138 of comparator 136 is supplied from a divider network includes resistors 140 and 142 and is about 0.15 volt. When capacitor 132 is sufficiently charged so that the voltage at terminal 134 exceeds the voltage at terminal 138, amplifier 136 triggers one shot circuit 148 which generates an output pulse of forty microsecond duration on output line 156. That output pulse is applied through resistor 158 to driver amplifier 160 that includes transistors 162 and 164 and the amplified output pulse is coupled by capacitor 176 to output terminal 178 as a flame present pulse. The amplified pulse is also coupled through resistor 180 and diode 182 to switch clamp transistor 184 into conduction, thus discharging capacitor 132 and resetting the filter 128.

A slow filter 190 includes resistor 192 and capacitor 194 and has a time constant of about 1½ seconds. The output of filter 190 is applied to input terminal 196 of comparator 198 whose reference terminal 200 which is connected to the voltage divider network of resistors 140, 142 via resistors 202 and 204. A second connection to reference terminal 200 is from the feedback network from the output of comparator 198 via diode 206 and resistor 208. The comparator output is also applied via resistor 210 and diode 212 to switch clamp transistor 184 into conduction. Should the output of filter 190 fall below 0.15 volt (the reference voltage at terminal 200), the output of comparator switches positive and applies a voltage through diode 206 to increase the reference voltage at terminal 200 to about 0.5 volt (thus raising the comparator threshold about 2½ times) and at the same time clamps capacitor 132 in discharged condition (via transistor 184) thus preventing the production of flame present pulse signals at terminal 178.

Thus, when the flame signal from the band pass amplifier 80 drops, in response to a low flame or no flame condition, comparator 198 switches its output signal, terminating the generation of output pulses at terminal 178 and also increasing the threshold of comparator 198. A larger flame signal (0.5 volt) is required to switch comparator 198 to remove the clamp from the flame pulse producing channel so that flame pulses will be again produced at output terminal 178 and when such flame signal is produced by filter 190, comparator 198 is switched back to the lower threshold value.

In operation, the burner 16A in proper operation provides a flame condition with fluctuating components in zone 22A. The sensor circuit 70 senses that fluctuating component and steady state components in zone 24 of flame 20 as well as in background radiation and produces an AC signal which coupled by capacitor 76 to the band pass amplifier 80 which amplifies that AC signal. As long as that AC signal above a minimum threshold is present, filter 128 periodically causes comparator 136 to trigger one shot 148 to produce a forty microsecond pulse at output terminal 178. Those output pulses are compatible with operating circuitry designed to respond to an ultraviolet flame sensor, for example. Should the magnitude of the output signal from the band pass amplifier fall sufficiently to switch comparator 198, however, the pulse generating circuit is clamped off and the threshold level is shifted by the feedback loop of comparator 198 to require a substantially greater magnitude of flame signal at terminal 62' to reinitiate the generation of output pulses at terminal 178 than was required to maintain application of those pulses at that terminal.

Values and types of components employed in the embodiment shown in FIG. 4 are set out in the following table:

| Reference No. | Component Value or Type |
|---|---|
| 52' | N5556T |
| 54' | CLM8500 |
| 60' | 1M |
| 64' | 3.2K |
| 74 | 100pf |
| 76 | 0.01uf |
| 78 | 100K |
| 82 | N5558T |
| 84 | N5558T |
| 86 | 220pf |
| 88 | 1M |
| 90 | 1M |
| 92 | 3.3K |
| 94 | 0.47uf |
| 96 | 0.022uf |
| 98 | 0.022uf |
| 100 | 39K |
| 102 | 39K |
| 104 | 33K |
| 106 | 10K |
| 108 | 10K |
| 124A | 1N4448 |
| 124B | 1N4448 |
| 126A | 3.3K |
| 126B | 3.3K |
| 130 | 33K |
| 132 | 1.8uf |
| 136 | N5558T |
| 140 | 10K |
| 142 | 100 |
| 144 | 33K |
| 146 | 4.7K |
| 148 | NE555T |
| 150 | 0.01uf |
| 152 | 0.001uf |
| 154 | 33K |
| 158 | 10K |
| 162 | 2N2222 |
| 164 | 2N3073 |
| 166 | 100K |
| 168 | 1K |
| 170 | 10K |
| 172 | 100 |
| 174 | 220 |
| 176 | 0.47uf |
| 180 | 1K |
| 182 | 1N4448 |
| 184 | 2N2222 |
| 192 | 33K |
| 194 | 56uf |

-continued

| Reference No. | Component Value or Type |
|---|---|
| 198 | N5558T |
| 202 | 3.3K |
| 204 | 33K |
| 206 | 1N4448 |
| 208 | 100K |
| 210 | 10K |

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

What is claimed is:

1. A flame monitoring system comprising
a flame sensor producing an electrical output signal having both higher frequency and lower frequency components derived from a monitored flame environment,
and signal processing circuitry connected to said flame sensor and responsive to both said higher frequency and said lower frequency components of said output signal, said signal processing circuitry including an amplifier and a feedback network with a variable impedance and being arranged so that said higher frequency components are amplified and the amplifier gain is decreased in response to an increase in said lower frequency components such that the resulting output of said signal processing circuitry provides discrimination between the flame monitored by said sensor and other conditions in the supervised environment.

2. The system as claimed in claim 1 wherein said flame sensor is a photosensor that has a high speed response characteristic.

3. The system as claimed in claim 1 wherein said signal processing circuit has a transfer function of the form $$E_{O(AC)} = \frac{KI_{D(AC)}}{I_{D(DC)}^n}$$

where $E_{O(AC)}$ is the output signal of said signal processing circuitry, $I_{D(AC)}$ is a higher frequency component of said flame signals, $I_{D(DC)}$ is a lower frequency component of said flame signal, and $n$ is in the range of 0.6–0.8.

4. The system as claimed in claim 2 wherein said signal processing circuitry further includes a radiation source connected to the output of said amplifier, and said feedback network includes a radiation responsive impedance element that is optically coupled to said radiation source and that has a response speed that is much slower than the response speed of said photosensor.

5. The system as claimed in claim 4 and further including selective attenuation circuitry coupled to said signal processing circuitry for attenuating components of said signal processing circuitry output.

6. The system as claimed in claim 5 wherein said selective attenuation circuitry includes band pass amplifier circuitry that has a band corresponding to the frequency range of said higher frequency components.

7. A flame monitoring system comprising:
a flame sensor for producing a flame signal as a function of flame conditions in a monitored environment,
flame signal enhancing circuitry coupled to said flame sensor, said flame signal enhancing circuitry having an amplifier and a feedback network with a variable impedance and being arranged so that a first characteristic of said flame signal is amplified and the amplifier gain is decreased in response to an increase in a second characteristic of said flame signal to provide an enhanced flame signal representative of the monitored flame as an output signal.

8. The system as claimed in claim 7 wherein said first characteristic is a higher frequency component of said flame signal and said second characteristic is a lower frequency component of said flame signal.

9. The system as claimed in claim 8 wherein said flame signal enhancing circuitry has a transfer function of the form $$E_{O(AC)} = \frac{KI_{D(AC)}}{I_{D(DC)}^n}$$

where $E_{O(AC)}$ is said enhanced flame signal, $I_{D(AC)}$ is said first characteristic of said flame signal, $I_{D(DC)}$ is said second characteristic of said flame signal, and $n$ is in the range of 0.6–0.8.

10. The system as claimed in claim 7 and further including selective attenuation circuitry coupled to said flame signal enhancing circuitry for attenuating components of said output signal corresponding to the frequency range of said second characteristic of said flame signal.

11. The system as claimed in claim 10 wherein said selective attenuation circuitry has a low frequency cutoff that excludes all signals in the range of said second characteristic.

12. The system as claimed in claim 11 wherein said low frequency cutoff is about 200 Hertz.

13. The system as claimed in claim 12 wherein said selective attenuation circuitry includes a band pass amplifier that has a center frequency of about 400 Hertz and a pass band of about 400 Hertz.

14. The system as claimed in claim 12 and further including gain adjustment means for varying the magnitude of said enhanced flame signal.

15. The system as claimed in claim 7 wherein said flame sensor is a photosensor.

16. The system as claimed in claim 15 wherein said photosensor is a solid state device that has a photosensitive junction region.

17. The system as claimed in claim 16 wherein said solid state device is a silicon photodiode device.

18. The system as claimed in claim 7 wherein said flame signal enhancing circuitry has a transfer function of the form $$E_{O(AC)} = \frac{KI_{D(AC)}}{I_{D(DC)}^n}$$

where $E_{O(AC)}$ is said enhanced flame signal, $I_{D(AC)}$ is said first characterstic of said flame signal, $I_{D(DC)}$ is said second characteristic of said flame signal, and $n$ is in the range of 0.6–0.8.

19. The system as claimed in claim 18 wherein said feedback network includes an impedance element that has a damped response to said flame signal.

20. The system as claimed in claim 19 and further including a radiation source coupled to be energized by the output of said amplifier and a slow speed photoresistor connected in said feedback network and optically coupled to said radiation source.

21. The system as claimed in claim 20 and further including gain adjustment means for varying the magnitude of said enhanced flame signal.

22. The system as claimed in claim 21 and further including selective attenuation circuitry coupled to said flame signal enhancing circuitry for attenuating components of said enhanced flame signal corresponding to the frequency range of said second characteristic of said flame signal.

23. The system as claimed in claim 22 wherein said sensor is a solid state silicon device that has a photosensitive junction region.

24. The system as claimed in claim 23 wherein said first characteristic is a higher frequency component of said flame signal and said second characteristic is a lower frequency component of said flame signal and said selective attenuation circuitry has a low frequency cutoff of about 200 Hertz.

* * * * *

UNITED STATES PATENT AND TRADEMARK OFFICE
CERTIFICATE OF CORRECTION

PATENT NO. : 4,039,844
DATED : August 2, 1977
INVENTOR(S) : Malcolm F. MacDonald It is certified that error appears in the above-identified patent and that said Letters Patent are hereby corrected as shown below:

Column 2, line 36, delete "the";

Column 4, line 6, after "1", insert --microampere--;

Column 4, line 13, change "rear" to --near--;

Column 4, line 15, change "second" to --sensed--;

Column 7, line 49, change "signals" to --signal--;

Column 7, line 66, after "a", insert --pass--.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks